No. 795,171. PATENTED JULY 18, 1905.
F. SADLER.
TIRE FOR VEHICLE WHEELS.
APPLICATION FILED JUNE 6, 1905.
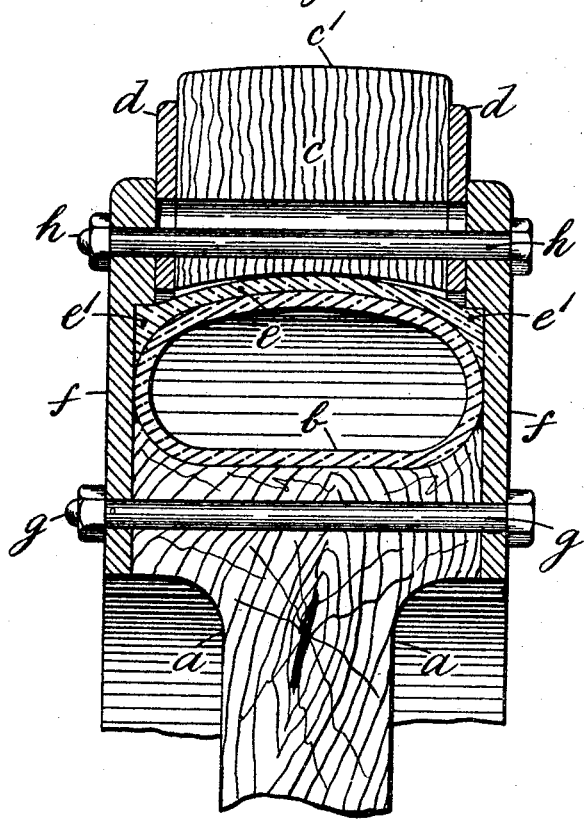
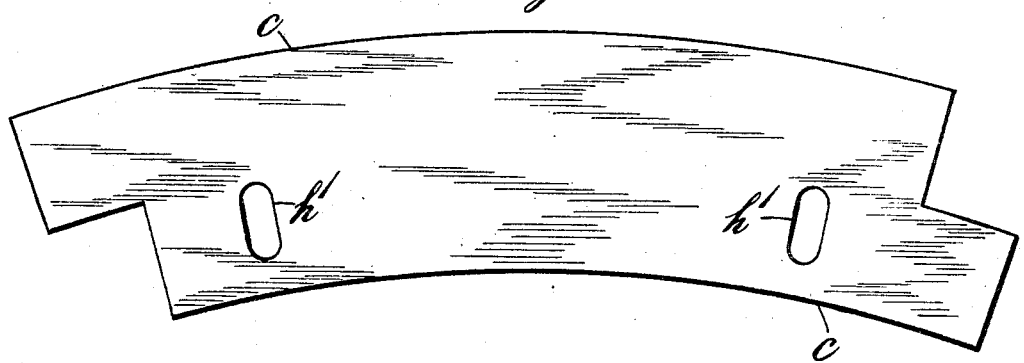

No. 795,171. Patented July 18, 1905.

UNITED STATES PATENT OFFICE.

FREDERICK SADLER, OF WANDSWORTH COMMON, ENGLAND.

TIRE FOR VEHICLE-WHEELS.

SPECIFICATION forming part of Letters Patent No. 795,171, dated July 18, 1905.

Application filed June 6, 1905. Serial No. 263,997.

*To all whom it may concern:*

Be it known that I, FREDERICK SADLER, a subject of the King of Great Britain, residing at 22 Gorst road, Wandsworth Common, in the county of Surrey, England, have invented a new and useful Improvement in Tires, of which the following is a specification.

My present invention relates to the tires of wheels of vehicles, such as motor-cars or carriages of other description running on ordinary roads.

It has for its object a novel construction by which the parts of the tire are held together very firmly and strongly and durably without liability to injury or serious wear and tear, while the entry of water between the parts of the tire is prevented and there is freedom from side slip between the tread of the tire and the road. I attain these objects by the means illustrated in the accompanying drawings, in which—

Figure 1 shows a transverse section through the rim and tire of a wheel. Fig. 2 shows a side elevation of one of the wooden segments used on the rim of the wheel.

Assuming that my invention is to be applied to strong wheels having wooden spokes and rims fitted together in the usual way, I arrange round the outside of the rim $a$ an elastic cushion $b$, which may either be in the form of an ordinary pneumatic tire, as shown, inflated with compressed air or of solid or tubular india-rubber, forming a strong elastic cushion, or of any other suitable elastic material. Upon the outer side of this elastic cushion or bed $b$ I fit a wooden tire, consisting of a sufficient number of separate pieces $c$, curved (in side view, as shown in Fig. 2) to the proper radius and the ends of which meet or nearly meet each other when they are forced in upon the elastic cushion. These wooden segments are made of suitable wood, but so that the parallel grain of the wood is as nearly as possible radial to the axis of the wheel. Upon both the sides of these wooden segments $c$ I fit and firmly screw or otherwise fix metal plates $d$, which cover nearly the whole side face of the wood $c$ and extend inward to or to within a short distance of the inner edge of the wooden segments $c$. These plates may be let into the sides of the wooden segments, so that their outer surfaces may be flush with the sides of the wooden segments, or, as shown in the drawings, they may cover the outer face of the wooden segments $c$.

The outer edges of the wooden segments $c$, which project for a sufficient distance, as shown at $c'$, form the "tread" of the tire upon the road, against which the end grain of the wood travels.

Upon the inner end of the wooden segments $c$ I fix a plate $e$, of india-rubber of sufficient thickness, the inner side side of which abuts against the pneumatic or other cushion $b$, while its lateral edges project for a short distance upon each side at $e'$ beyond the sides of the wooden segments $c$ and of the plates $d$, fixed upon the latter, so that the entire width of the india-rubber $e$ is the same as the width of the wooden rim $a$ of the wheel. Upon each side of the wooden rim of the wheel I firmly bolt or fix an annular metal plate $f$, the inner edge of which extends inward as far, or nearly so, as the inner edge of the wooden rim $a$, while its outer edge extends outwardly against the sides of the plates $d$, covering the wooden segments $c$ to a sufficient distance from the outer or operative face of the latter so that the wooden segments and the india-rubber plates fixed to them can move radially in and out for a sufficient distance. The outer edges of the annular metal plates are flat or they may be thickened or bent in on the inside for a sufficient distance inward, as shown, so as to form flanges the inner edges of which embrace and squeeze in the projecting edge of the india-rubber plate $e$, attached to the wooden segments $c$, and retain the latter in their proper position, while making a watertight joint between them.

The annular metal plates $f$ are fixed to the wooden rim $a$ by bolts $g$ passing transversely through them, so that the plates can be readily removed and replaced. The blocks $c$ and the plates $d$ are held in place by round or square transverse bolts $h$ passing through them and through the plates $f$, the bolt-holes through the blocks $c$ and the plates $d$ being elongated radially, as shown at $h'$, Fig. 2, so as to allow them to move inward radially when the blocks $c$ are pressed upon the road in traveling.

My invention may be applied to any kind of wheel.

Having fully described my invention, what I desire to claim and secure by Letters Patent is—

1. In a tire for the wheels of motor-cars and other vehicles, the combination with the rim of the wheel, of the side plates secured to said rim and provided with shoulders, an elastic cushion mounted exterior to said rim and between said side plates, an elastic pad mounted exterior to said cushion and engaging beneath said shoulders in said side plates, segmental plates mounted between the outer ends of said side plates, and segments of wood mounted between said segmental plates, said segments of wood and segmental plates being provided with elongated slots, with bolts passing through said side plates and through said elongated slots, substantially as described.

2. In a tire for the wheels of motor-cars and other vehicles, the combination with the rim of the wheel, of the side plates secured to said rim, an elastic cushion mounted exterior to said rim and between said side plates, an elastic pad mounted exterior to said cushion and between said side plates, segmental plates mounted between the outer ends of said side plates, and segments of wood mounted between said segmental plates, said segments of wood and segmental plates being provided with reversely-notched ends and with elongated slots, with bolts passing through said side plates and through said elongated slots, substantially as described.

In witness whereof I have hereunto set my hand in the presence of two witnesses.

FREDERICK SADLER.

Witnesses:
ARTHUR E. EDWARDS,
D. K. BOYLE.